(12) United States Patent
Min

(10) Patent No.: US 8,191,859 B2
(45) Date of Patent: Jun. 5, 2012

(54) WATER FLOW CONTROL VALVE

(75) Inventor: Tae-Sik Min, Seoul (KR)

(73) Assignee: Kyungdong Network Co., Ltd., Seoul (KR)

( * ) Notice: Subject to any disclaimer, the term of this patent is extended or adjusted under 35 U.S.C. 154(b) by 678 days.

(21) Appl. No.: 12/278,854

(22) PCT Filed: Dec. 29, 2006

(86) PCT No.: PCT/KR2006/005876
§ 371 (c)(1), (2), (4) Date: Aug. 8, 2008

(87) PCT Pub. No.: WO2007/097521
PCT Pub. Date: Aug. 30, 2007

(65) Prior Publication Data
US 2009/0020717 A1    Jan. 22, 2009

(30) Foreign Application Priority Data

Feb. 22, 2006  (KR) .................. 10-2006-0017209

(51) Int. Cl.
*F16K 31/44* (2006.01)
(52) U.S. Cl. ........ 251/229; 251/230; 251/248; 251/251; 251/129.11
(58) Field of Classification Search ............. 251/251, 251/230, 129.11, 229, 248
See application file for complete search history.

(56) References Cited

U.S. PATENT DOCUMENTS

| | | | | |
|---|---|---|---|---|
| 1,989,942 A | * | 2/1935 | Parks et al. | 251/129.12 |
| RE21,977 E | * | 12/1941 | Hotchkiss | 236/1 R |
| RE24,663 E | * | 6/1959 | Markley | 251/129.12 |
| 3,015,963 A | * | 1/1962 | Terry | 74/44 |
| 3,108,499 A | * | 10/1963 | Duncan | 137/315.01 |

(Continued)

FOREIGN PATENT DOCUMENTS

| | | |
|---|---|---|
| JP | 2001-304724 | 10/2001 |
| KR | 1019830000802 | 4/1983 |
| KR | 1019990080287 | 11/1999 |

OTHER PUBLICATIONS

International Search Report for Application No. PCT/KR2006/005876, dated Apr. 11, 2007.

*Primary Examiner* — John Fristoe, Jr.
*Assistant Examiner* — Marina Tietjen
(74) *Attorney, Agent, or Firm* — Nelson Mullins Riley & Scarborough LLP; Anthony A. Laurentano

(57) ABSTRACT

The present invention provides a water flow control valve, which has an improved structure, thus reducing manufacturing costs and increasing the reliability of products. To achieve the above-mentioned purpose, the water flow control valve includes synchronous motors (20), which generate drive forces in directions opposite each other, an eccentric cam (30), which is provided between the synchronous motors (20) and converts a direction in which the drive force is transmitted, a power transmission unit (50), which is in rolling contact with the eccentric cam and adjusts the amount of fluid that flows through a housing using operation of the eccentric cam, and ratchet gears (40), which are provided between the synchronous motors and the eccentric cam and transmit the drive force of one of the synchronous motors while preventing the drive force of the remaining synchronous motor from being transmitted in a no-load operation manner.

3 Claims, 3 Drawing Sheets

U.S. PATENT DOCUMENTS

| | | | |
|---|---|---|---|
| 4,225,110 A * | 9/1980 | Akkerman et al. | 251/58 |
| 4,428,398 A * | 1/1984 | Mito et al. | 137/530 |
| 4,650,159 A * | 3/1987 | Shimamura | 251/263 |
| 5,076,782 A | 12/1991 | Campbell et al. | |
| 6,572,075 B2 * | 6/2003 | Iwabuchi | 251/64 |
| 6,971,628 B2 * | 12/2005 | Ichimaru | 251/129.11 |

* cited by examiner

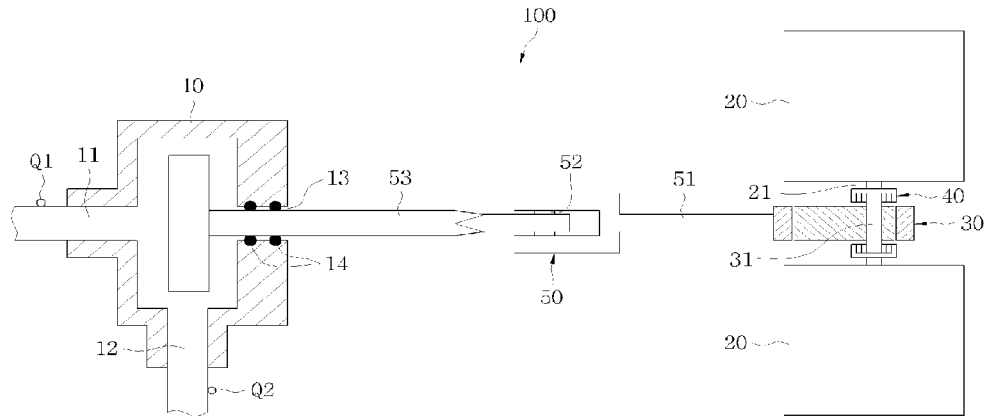
[Fig. 1]
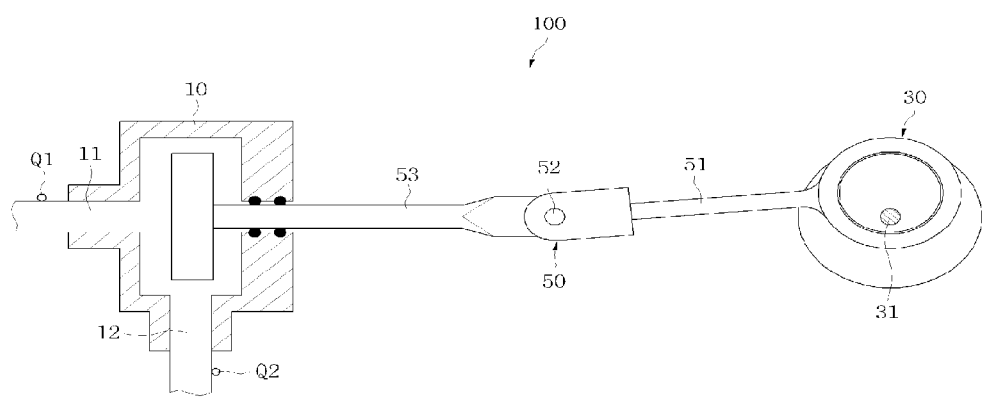
[Fig. 2]
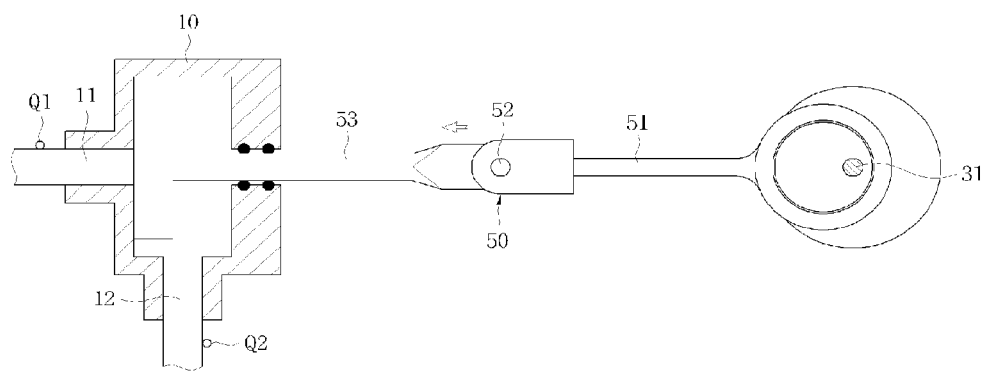
[Fig. 3]
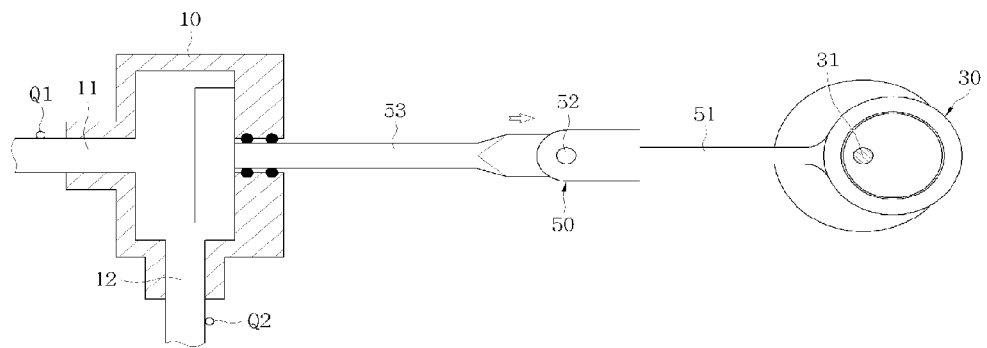
[Fig. 4]

[Fig. 5]
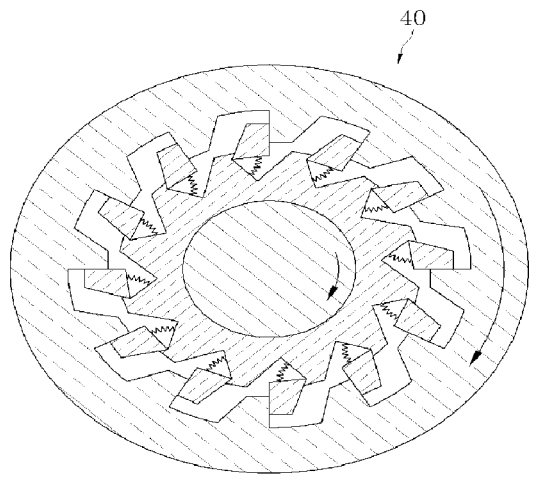
[Fig. 6]
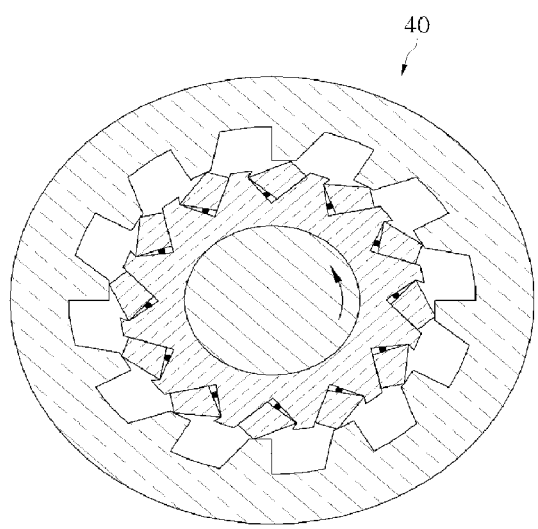
[Fig. 7]
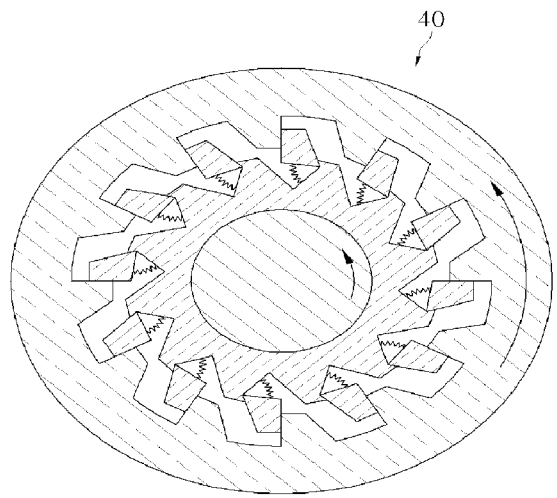

[ Fig. 8 ]
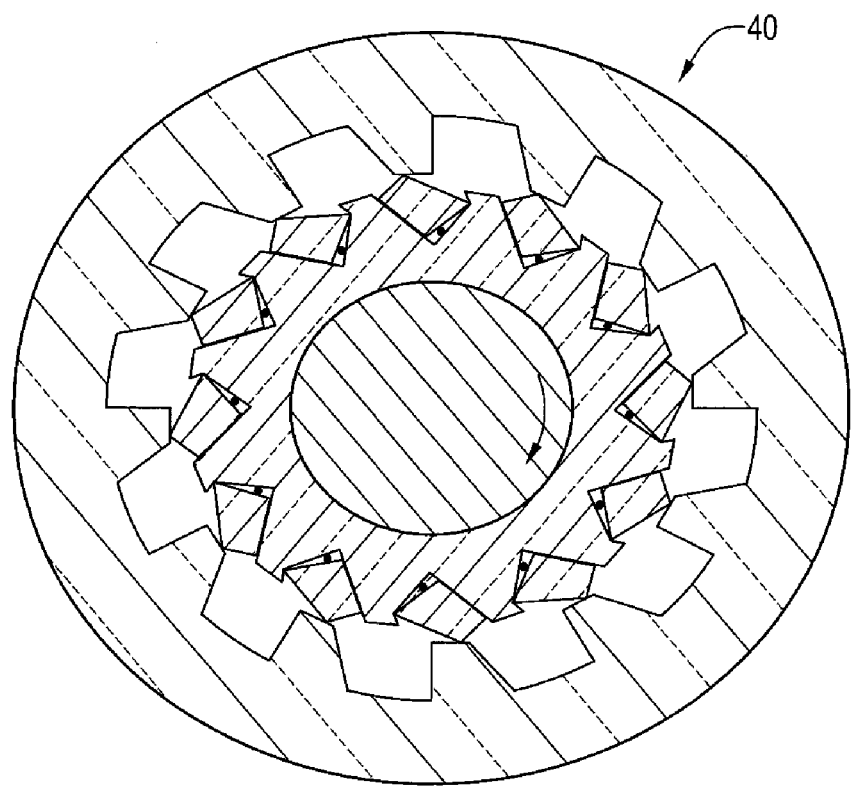
[ Fig. 9 ]
(Prior Art)
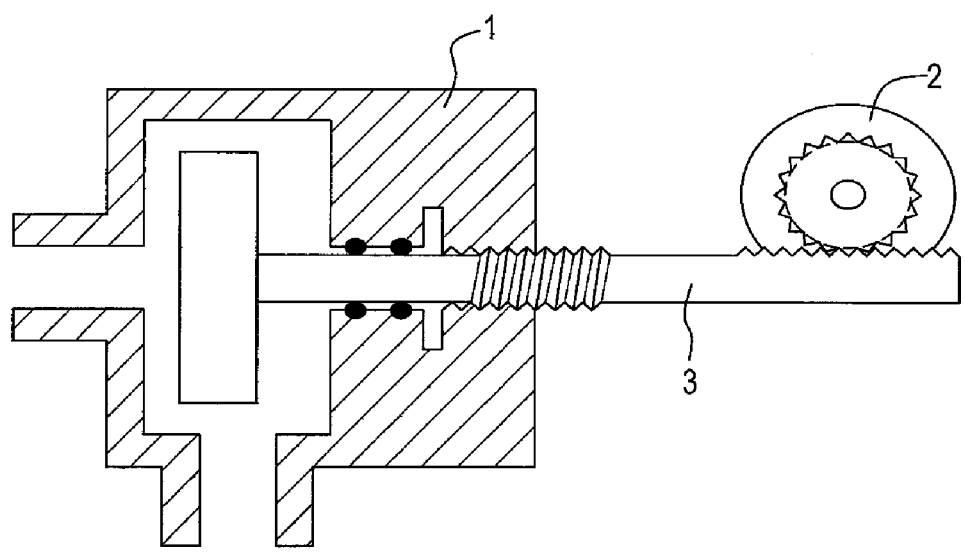

WATER FLOW CONTROL VALVE

TECHNICAL FIELD

The present invention relates to a water flow control valve which has a compact structure, thus ensuring superior processability and workability and being inexpensive.

BACKGROUND ART

As shown in FIG. 9, a conventional water flow control valve includes a housing 1, a motor 2 and a power transmission shaft 3, a first end of which is operated in conjunction with the motor 2, and a second end of which is screwed into the housing 1 and is disposed adjacent to an inlet of the housing 1.

In the conventional water flow control valve, the power transmission shaft 3 is rotated by drive force of the motor 2, and is thus moved forwards or backwards along the circumferential inner surface of the housing 1, thereby opening or closing the inlet of the housing 1, and controlling water flow.

DISCLOSURE OF INVENTION

Technical Problem

However, the conventional water flow control valve is problematic in that, because power transmission is conducted using a gear structure, the structure of the water flow control valve is complex, and thus the workability of the manufacturing process is reduced.

Furthermore, a DC motor or a stepping motor is used in the water flow control valve. The DC motor is inexpensive and is able to transmit a relatively large force, but, because a brush is easily worn by repeated reciprocal rotation, there is a disadvantage in that the lifetime of the motor is reduced.

The stepping motor has a structure such that a rotor and a stator engage with each other in a structure similar to that of a toothed wheel, so that the rotation thereof can be precisely controlled. However, the stepping motor has a disadvantage in that it is expensive.

Technical Solution

Accordingly, the present invention has been made keeping in mind the above problems occurring in the prior art, and an object of the present invention is to provide a water flow control valve, which has an improved structure, thus reducing the manufacturing costs and increasing the reliability of products.

Advantageous Effects

The present invention provides a water flow control valve, which includes synchronous motors that are reversibly rotated, an eccentric cam that converts rotating force of the synchronous motors into forward or backward linear motion, and a power transmission unit that adjust the amount of water that flows through a housing using the operation of the eccentric cam. The water flow control valve of the present invention thus has a compact structure. Furthermore, the water flow control valve of the present invention has an advantage in that, because typical AC motors can be used as the synchronous motors, it is inexpensive.

BRIEF DESCRIPTION OF THE DRAWINGS

FIG. 1 is a schematic plan sectional view of the present invention;

FIG. 2 is a schematic front sectional view of the present invention;

FIGS. 3 and 4 are schematic views showing the operation of an eccentric cam according to the present invention;

FIGS. 5 through 8 are schematic views showing the operation of a ratchet gear according to the present invention; and FIG. 9 is a schematic sectional view showing a conventional water flow control valve.

BEST MODE FOR CARRYING OUT THE INVENTION

In order to accomplish the above object, the present invention provides a water flow control valve, including: a pair of synchronous motors that generate drive forces in directions opposite each other; an eccentric cam provided between the synchronous motors and operated in conjunction with the synchronous motors, the eccentric cam converting a direction in which the drive force is transmitted; a power transmission unit in rolling contact with the eccentric cam and adjusting an amount of fluid that flows through a housing using operation of the eccentric cam; and ratchet gears provided between the synchronous motors and the eccentric cam and transmitting the drive force of one of the synchronous motors while preventing the drive force of a remaining synchronous motor from being transmitted in a no-load operation manner.

Mode for the Invention

Hereinafter, a preferred embodiment of the present invention will be described in detail with reference to the attached drawings.

FIG. 1 is a schematic plan sectional view of the present invention. FIG. 2 is a schematic front sectional view of the present invention. FIGS. 3 and 4 are schematic views showing the operation of an eccentric cam according to the present invention. FIGS. 5 through 8 are schematic views showing the operation of a ratchet gear according to the present invention. FIGS. 5 and 6 are schematic views showing the operation of a ratchet gear according to the present invention.

As shown in FIGS. 1 and 2, a water flow control valve 100 of the present invention includes a housing 10, which defines a passage, along which fluid flows, therein, a pair of synchronous motors 20, which generate rotating force in directions opposite each other, and the eccentric cam 30, which is coupled to a rotating shaft 31 such that the eccentric cam 30 is eccentrically rotated. The water flow control valve 100 further includes ratchet gears 40, which are provided between the synchronous motors 20 and the eccentric cam 30 and are operated in conjunction with them. Each ratchet gear 40 transmits the rotating force of the corresponding synchronous motor 20 in only one direction. The water flow control valve 100 further includes a power transmission unit 50, a first end of which is in rolling contact with the eccentric cam 30, and a second end of which is provided in the housing 10 so as to be movable forwards and backwards. Thus, the power transmission unit 50 opens and closes an inlet 11 of the housing 10 using the rotating force of the eccentric cam 30.

The housing 10 has therein the inlet 11 and an outlet 12, through which fluid flows. A coupling hole 13 is formed through the housing 10 at a position corresponding to the inlet 11, such that a rod 53, which will be explained later herein, is disposed along the same axis as that of the inlet 11.

At least one sealing member 14 is provided on the circumferential inner surface of the coupling hole 13.

A typical AC motor may be used as each synchronous motor 20. The synchronous motors 20 are oriented such that output shafts thereof 21 face each other, thus generating drive force in directions opposite each other.

The eccentric cam 30 is coupled to the rotating shaft 31 at an eccentric position spaced apart from the center thereof by a predetermined distance.

The ratchet gears 40 are disposed between the output shafts 21 of the synchronous motors 20 and the rotating shaft 31 of the eccentric cam 30 to control the direction in which the eccentric cam 30 is rotated.

That is, the ratchet gears 40 are constructed such that, when the drive force one synchronous motor 20 is transmitted to the eccentric cam, the drive force of the other synchronous motor 20 is prevented from being transmitted to the eccentric cam. As shown in FIG. 6, each ratchet gear 40 has a typical ratchet gear structure, therefore further explanation of the structure thereof is deemed unnecessary.

The power transmission unit 50 includes a crank shaft 51, a first end of which is fitted over and is in rolling contact with the circumferential outer surface of the eccentric cam 30, and the rod 53, which is coupled to a second end of the crank shaft 51 by a hinge 52 and is inserted into the coupling hole 13 of the housing 10 such that an end thereof is disposed adjacent to the inlet 11 of the housing 10.

Furthermore, a water flow sensor Q is provided in the outlet 12. A control unit (not shown), which controls the water flow control valve 100 in response to a signal transmitted from the water flow sensor Q, is provided.

The operation and effect of the water flow control valve 100 will be explained herein below with reference to FIGS. 3 and 5. To reduce water flow, the rotating force of the corresponding synchronous motor 20 is transmitted to the eccentric cam 30 through the associated ratchet gear 40 such that the eccentric cam 30 is rotated in a clockwise direction. Then, as shown in FIG. 3, the crank shaft 51, which is in rolling contact with the eccentric cam 30, advances the rod 53 forwards. Thereby, the rod 53 is moved forwards through the coupling hole 13, thus reducing the opening ratio of the inlet 11.

Meanwhile, as shown in FIGS. 4 and 6, to increase water flow, the rotating force of the other synchronous motor 20 is transmitted to the eccentric cam 30 through the associated ratchet gear 40 such that the eccentric cam 30 is rotated in a counter-clockwise direction. Then, the crank shaft 51, which is in rolling contact with the eccentric cam 30, is moved in the direction shown in FIG. 4. Thereby, the rod 53 is moved backwards through the coupling hole 13 of the housing 10, thus increasing the opening ratio of the inlet 11. As a result, water flow is increased.

At this time, the control valve reads a data value of the amount of water that flows through the water flow sensor Q of the outlet 12, and controls the opening degree of the inlet 11, opened by the water flow control valve 100, thus maintaining the water flow of the outlet 12 constant.

In detail, the water flow control valve 100 is opened to a set opening degree, and the opening degree thereof is accurately controlled by the signal of the control unit. In this process, if the value detected by the water flow sensor Q is greater than the set data value while the opening degree of the water flow control valve 100 is maintained at the set opening degree, the rod is advanced towards the inlet 11 a predetermined distance by drive force transmitted from the corresponding synchronous motor 20 through the eccentric cam 30 and the power transmission unit 50. At this time, the water flow sensor Q detects the water flow that passes through the outlet 12, and the control unit compares the data value transmitted from the water flow sensor Q with the set data value. If the detected data value is less than the set data value, the power of the synchronous motor 20 is interrupted, and, simultaneously, the rod is moved away from the inlet 11 by a predetermined distance by drive force transmitted from the other synchronous motor 20 through the eccentric cam 30 and the power transmission unit 50. The water flow of the valve can be precisely maintained at the set water flow value by repeating this control operation.

Here, as shown in FIGS. 3 and 4, when the rotating shaft 31 is rotated in one direction by drive force of the one synchronous motor 20 and the eccentric cam 30 thus reaches the top dead point, the power transmission unit 50 is advanced to the frontmost position. When the rotating shaft 31 is rotated in the other direction by drive force of the other synchronous motor 20 and the eccentric cam 30 thus reaches the bottom dead point, the power transmission unit 50 is advanced to the rearmost position.

As shown in FIGS. 5 and 6, when the control unit maintains a water flow value of the valve at the set water flow rate, the opposite synchronous motors 20 are reversibly rotated. In this process, while clockwise rotating force of one synchronous motor 20 is transmitted to the eccentric cam 30, if the control unit rotates the synchronous motors 20 in counterclockwise directions, the counterclockwise rotating force of the other synchronous motor 20 is instantaneously transmitted to the eccentric cam 30, thus the eccentric cam 30 is rotated in a counterclockwise direction. As such, when the drive force of one synchronous motor 20 is transmitted to the eccentric cam 30, the drive force of the other synchronous motor 20 is interrupted by the power transmission of the ratchet gear 40.

INDUSTRIAL APPLICABILITY

As described above, the present invention provides a water flow control valve, which includes synchronous motors that are reversibly rotated, an eccentric cam that converts rotating force of the synchronous motors into forward or backward linear motion, and a power transmission unit that adjust the amount of water that flows through a housing using the operation of the eccentric cam. As such, the water flow control valve has a compact structure. Furthermore, the water flow control valve of the present invention has an advantage in that, because typical AC motors can be used as the synchronous motors, it is inexpensive.

The invention claimed is:

1. A water flow control valve, comprising:
   a first synchronous motor and a second synchronous motor that generate drive forces in directions opposite to each other;
   an eccentric cam provided between the first and second synchronous motors and operated in conjunction with the synchronous motors, the eccentric cam converting a direction in which the drive force is transmitted;
   a power transmission unit in rolling contact with the eccentric cam and adjusting an amount of fluid that flows through a housing operation of the eccentric cam; and
   ratchet gears provided between the synchronous motors and the eccentric cam and constructed such that when the drive force of one synchronous motor is transmitted to the eccentric cam, the drive force of the other synchronous motor is prevented from being transmitted to the eccentric cam in a no-load operation manner,
   wherein the eccentric cam is coupled to a rotating shaft such that the eccentric cam is eccentrically rotated and the synchronous motors are rotated around the rotating shaft,
   wherein the ratchet gears are located around the rotating shaft, and wherein the first synchronous motor transmits the drive force when a water flow is below a preset data, while the second synchronous motor transmits the drive force when a water flow is above the preset data.

2. The water flow control valve according to claim 1, wherein the power transmission unit comprises a crank shaft coupled to a circumferential outer surface of the eccentric cam by a bearing, and a rod coupled to the crank shaft by a hinge and inserted into a coupling hole of the housing so as to be movable towards and away from an inlet of the housing.

3. The water flow control valve according to claim 1, wherein the housing has an inlet, through which the fluid is drawn, an outlet, which communicates with the inlet, a coupling hole, which is formed through the housing such that a rod is disposed along a same axis as an axis of the inlet, and at least one O-ring to maintain airtightness of the power transmission unit inserted into the coupling hole.

* * * * *